United States Patent [19]

Mintz et al.

[11] Patent Number: 4,634,510
[45] Date of Patent: Jan. 6, 1987

[54] CLARIFYING A CONTAMINATED FLUID

[75] Inventors: Donald J. Mintz, Summit; Cornelius H. Brons, Washington; Floyd E. Smith, East Windsor, all of N.J.

[73] Assignee: Exxon Research and Engineering Company, Florham Park, N.J.

[21] Appl. No.: 601,272

[22] Filed: Apr. 17, 1984

[51] Int. Cl.$^4$ .............................................. B03C 5/02
[52] U.S. Cl. ..................................... 204/188; 204/186; 204/302; 208/307; 210/748
[58] Field of Search ............... 204/186, 188, 302–308; 210/748, 243; 55/10, 107; 208/307

[56] References Cited

U.S. PATENT DOCUMENTS

| | | | |
|---|---|---|---|
| 1,377,021 | 5/1921 | Mumford | 204/186 |
| 3,412,002 | 11/1968 | Hubby . | |
| 3,489,669 | 1/1970 | Ruhnke | 204/302 |
| 3,528,907 | 9/1970 | Watson et al. | 204/302 |
| 3,567,619 | 3/1971 | Brown . | |
| 3,616,460 | 10/1971 | Watson | 204/302 |
| 3,799,855 | 3/1974 | Franse | 204/188 |
| 4,049,520 | 9/1977 | Wagner | 204/186 |
| 4,101,563 | 7/1978 | Landis | 260/425 |
| 4,193,774 | 3/1980 | Pilat | 55/10 |
| 4,255,777 | 3/1981 | Kelly | 361/228 |
| 4,341,617 | 7/1982 | King | 204/302 |
| 4,469,582 | 3/1984 | Sublette | 204/302 |

OTHER PUBLICATIONS

G. V. Jorgenson & E. Will, "Improved Ion Drag Pump", Jan. 1962, Review of Scientific Instruments, vol. 33, pp. 55–56.
Pohl & Schwer, "Particle Separations by Nonuniform Electric Field in Liquid Dielectrics, Batch Methods", J. Electrochemical Soc., 107, 383 (1960).
Stuetzer, "Electrohydrodynamic Precipitator", Rev. of Sci. Inst., 33, 1171 (1962).

Primary Examiner—John F. Niebling
Assistant Examiner—William T. Leader

[57] ABSTRACT

In the treatment of a contaminated liquid, an additive, such as finely divided adsorbent particles, is introduced into the liquid so that it combines physically, chemically or electrically with the contaminant to form a dispersion suspended in the liquid. Then, net unipolar charge is introduced into the liquid and, in a separation vessel, migration of the dispersion takes place under the interaction between charge on the dispersion and an induced electric field in the liquid. The migrating dispersion conglomerates on one or more collector surfaces which can be the internal surfaces of the separation vessel and, preferably also, the exposed surfaces of densely packed beads in the separation vessel. The treatment process is especially intended for use where the contaminant is dissolved in the liquid phase.

23 Claims, 6 Drawing Figures

CLARIFYING A CONTAMINATED FLUID

CROSS-REFERENCE TO RELATED APPLICATIONS

The specification of this application refers to other application(s) of the present assignees filed on the same day as the present application and bearing the undermentioned assignee case reference(s):
Ser. No. 601,254
Ser. No. 601,275

BACKGROUND OF THE INVENTION

This invention relates to clarifying a contaminated fluid. The contaminant may be a solid, liquid, gel or gas, or any combination of these, and the invention is particularly concerned with the removal of dissolved contaminants. An example would be the separation of vacuum resid (residuum from a vacuum distillation process) from a hydrocarbon oil. The invention also finds application to micron and sub-micron sized contaminants which cannot easily be removed by known separation techniques. "Fluid phase" is used to indicate that the continuous background phase may be either a liquid or gas, liquid being the more usual.

DESCRIPTION OF THE PRIOR ART

Numerous electrostatic separation techniques in various forms for the removal of dispersed contaminants from continuous background fluid phases are well known in the art. Many of these techniques involve the application of an external electric field which attracts the contaminant dispersion to a collection and separation region where, in the case of particulate contaminant for example, the contaminant collects and builds up on one or more collector surfaces. These techniques, however, are of reduced effectiveness for contaminant particles of small size, e.g. micron and sub-micron sized particles, because the attractive force acting on each particle usually diminishes as some function of the particle size. Furthermore, in the case where the contaminant is dissolved in the background fluid phase, the aforesaid techniques in themselves are not usually suitable and special measures have to be taken.

U.S. Pat. Nos. 4,155,924 (Landis) and 4,049,520 (Wagner) disclose a complex decontamination treatment process, intended for nonpetroleum organic liquids, involving a pretreatment step affecting the chemical properties of some of the impurities, followed by the addition of finely dispersed solid adsorbent and subsequent treatment steps including temperature treatment, dehydrating and deaerating and electrofiltration.

In U.S. Pat. No. 3,790,461 (Yeh) a finely divided conductor is charged to impart adsorbent properties to the conductor so that the contaminants adhere to the finely divided conductor. This finely divided material can be regenerated or separated by filtration or settling.

In U.S. Pat. No. 3,682,807 (Ishibashi) waste oil containing solid particle impurities is is refined by producing sparking to generate carbon particles which cause aggregation of the impurity particles.

Another treatment process is known from U.S. Pat. No. 1,162,213 (Bloom) in which a contaminated fluid such as an aqueous or alcoholic liquid is passed through a mass of comminuted, solid adsorption material in the presence of an alternating electric field which causes adsorbence upon such material, to promote flocculation and precipitation.

A rather different approach is disclosed in U.S. Pat. No. 1,405,130 (Harris) for dehydrating fine emulsions of oil and water by mixing a coarse emulsion with the fine emulsion and subjecting the mixture to the action of an electric current.

It is also known from U.S. Pat. No. 3,293,165 (Olney) to contact a water-in-oil emulsion with particles each comprising two solids with different electrical properties, to cause coalescence of the water droplets.

U.S. Pat. No. 2,067,345 (Roberts) relates to purifying an oil phase contaminated with polar substances, in which the contaminated oil is intimately mixed with an adsorbent substance of high polar moment, the mixture is subjected to electromagnetic stress, and the high polar moment substance with adsorbed contaminant is removed from the oil phase. Similarly to the aforesaid Ishibashi patent, the high polar moment substance can be carbonaceous particles produced by the action of an electric arc.

Finally, reference is directed to U.S. Pat. No. 1,377,021 (Mumford) in which impurities are removed from oil by mingling with an open textured granular vegetable carbon and subjecting the combination to the influence of an electrostatic field generated by a pair of electrode plates.

SUMMARY OF THE INVENTION

"Conglomeration" as used hereinbelow throughout the specification refers to agglomeration (with or without coalescence) in the case of gas bubbles or liquid droplets of contaminant, and to agglomeration in the case of solids and gels to form contaminant particles of larger size. The present invention pertains to a method of clarifying a contaminated fluid (usually a contaminated liquid). In putting the method into effect, an additive is selected so that it combines with the contaminant to form a dispersion (droplets, solid or gel-like particles or gas bubbles) suspended in the fluid. The additive can be solid particles, or liquid droplets or gas bubbles. The additive is introduced into the contaminated fluid to form the dispersion. In the case of solid particles, this merely involves admixture. Suitable ways of introducing the additive in the form of droplets or bubbles will be well known to the man skilled in the art and are not further described herein.

In addition, electric charge which is net unipolar (net positive or net negative) is introduced into the fluid to cause both the dispersion to become charged and an electric field to be induced in the fluid so that the charged dispersion and field interact to cause migration of the dispersion within the fluid. The migrating dispersion is allowed "accumulate in a region within a body of the charged fluid. It will usually" undergo conglomeration sufficiently to come out of suspension in the fluid, as is described in more detail below. The migration effect is brought about, substantially due to the introduced free charge, as will also be explained below."

Depending on the nature of the dispersion, which dispersion comprises the additive combined with the contaminant (usually physically and/or chemically combined but combination electrically, such as by electrostatic attraction between the additive and contaminant, is also a possibility), the dispersion conglomerate will come out of suspension either as gas bubbles which rise to the surface of the fluid phase (assuming it to be a liquid as is usually the case) or may agglomerate on collector surfaces in the path of the migrating bubbles, or as droplets or gel-like globules or conglomerated particles which will either rise or, more usually, settle, according to the relative densities of the contaminant phase and the liquid with which it is in contact, or possibly as microscopic droplets on the collector surfaces, or as any combination of these effects.

The basis for the effective separation that can be achieved when putting this invention into effect is believed by the inventors to be as follows. For simplicity the following description applies to the case where the continuous background phase is a liquid, but the differences where it is a gas are discussed briefly later. The first step is to provide a dispersion (containing the contaminant in combined form) which can be separated from the background liquid phase. Where the contaminant is in solution, the additive combines with contaminant so as to bring it out of solution. Where the contaminant is in the form of particles, droplets or gas bubbles of small size (typically micron or sub-micron size), the additive serves to provide a dispersion of larger constituent size, i.e. particle, droplet or bubble size than the original contaminant size.

Most suitably, the additive will combine with the contaminant physically or chemically. For example, it is preferred that the additive have sorbent properties, in particular adsorbent properties. A preferred application of the invention is the separation of a dissolved contaminant from a liquid, in which case the additive may comprise finely divided solid particles of sorbent material. Alternatively, it is feasible for the additive to be selected so that it will combine electrically with the contaminant, e.g. by electrostatic attraction.

The next step in the process is the production of an excess (i.e. net unipolar-positive or negative) charge density in the otherwise electrically-neutral multiphase fluid mixture. This is achieved by the introduction of free excess charge, i.e. net positive or negative ions which, initially are free to move through the continuous background phase. Several techniques are available to produce a transient or steady-excess charge density. Broadly speaking, such methods fall into two general categories, namely: (1) injection of excess charge across the interface or boundary which confines the liquid containing the contaminant/additive dispersion, and (2) volumetric charge introduction techniques into the bulk of the liquid. Examples of the first category include electron beam and high energy particle radiation, photoemission and charge transport by a moving fluid. Reference is hereby directed to U.S. Pat. No. 4,255,777 in the name Arnold J. Kelly, assigned to the present assignees, the contents of which are expressly incorporated herein, for a description of one example of how charge injection predominantly or solely by field emission, can be achieved. Electron beam, photoemission and field emission are all examples of electron emission. Examples of the second category are photoionization of either or both of the dispersion and background liquid phases, and secondary ionization by thermalization of high energy particle irradiation of the dispersion-containing liquid. These examples all involve ionic dissociation within the liquid background phase.

It is necessary that there be an excess of free charge in the sense of a sufficient abundance that an effective migration of the dispersion of contaminant/additive will occur. The charge introduced must be net negative or net positive. However, providing this requirement is met, then it is equally possible to introduce the excess charge using two streams of the same dispersion-bearing liquid of opposite but unequal levels of charge or alternating net positive and net negative streams for the purposes of agglomeration prior to collection, in the first case, or multilayer precipitation in the second case (e.g. collecting a net negative layer then a net positive layer, and so forth, of dispersed phase).

The third step in the process is the transference of the major portion of the excess charge to the contaminant/additive dispersion in the liquid. In a preferred way of performing the invention in which a charge injector, such as disclosed in the aforesaid U.S. Pat. No. 4,255,777, is used for introducing net unipolar free excess charge into a stream of the dispersion-laden liquid, the stream issues from the charge injector as a continuous stream or spray through a gas or vapor space, usually an air space, and enters a separation vessel where a body of charged liquid is collected. The gas or vapor space is provided to enable the charged stream to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular significance to the effective separation of the dispersion from the liquid whether the dispersion-laden stream is sprayed by the charge injector or simply issues as a continuous stream into the separation vessel, particularly at relatively high velocity throughputs in the charge injector. However, when the liquid is sprayed, the individual liquid droplets are in general separated from one another and this can be important where lower throughput velocities, closer to the drift velocity of the individual charges, are employed.

It is however remarked that it is necessary that there be no contact between the spray or stream passing through the gas or vapor space and the surrounding separation vessel wall, in order to avoid charge dissipation. Where the continuous background phase is a gas, this can be achieved by introducing a secondary gas flow which provides an inner annular protective sheath on the surrounding wall surfaces.

Suitably, the gas or vapor space can be provided by the ambient atmosphere separating the charge injector from the separation vessel, or it can be enclosed and a purge gas, e.g. nitrogen, circulated through the space to avoid any risk of explosion or detrimental chemical reaction. In addition, the purge gas helps to obtain uniform separation results irrespective of changes in ambient conditions, especially humidity, which can affect the rate of depletion of charge where an air space is present. In the absence of any such gap, reduced separation efficiencies will result. According to a development, the gas or vapor space is pressurized which can maintain a satisfactory throughput rate in the separation vessel even for rather viscous liquids and can increase the throughput rate for less viscous liquids. In the separation region, it is assumed that the excess charge density exceeds the liquid background charge density (i.e. the density of bipolar charge carriers which are intrinsic to the liquid and which result in the conductivity of the liquid); then the induced electric field in the separation region caused by the excess charge density will act on the individual charge carriers and drive them towards the boundaries of the liquid. Some of the charge will be intercepted by the dispersion of contaminant/additive and the dispersion will thereby become charged.

The next part in the process involves the agglomeration of the migrating dispersion. Usually, this will occur on collector surfaces in the path of the migrating dispersion, which can be the inner wall surface regions of the separation vessel, and, where a bed of densely-packed beads fills at least part of the space within the separation vessel, the exposed surface areas of the beads themselves. Some agglomeration of colliding migrating constituents of the dispersion may also occur within the bulk of the liquid itself, and this effect is more pronounced, the higher the density of the dispersion constituents. Thus, for solid and gel-like dispersion, the dispersion tends to build up on the walls and inner surfaces of the separation vessel and on the beads, whereas gas bubbles of contaminant tend to adhere to the collector surfaces and/or to rise through the liquid in the separation vessel and liquid globules and droplets will usually settle or rise, according to their density relative to that of the continuous phase, and/or to adhere to the collector surfaces. Reference is directed to co-pending U.S. pat. applications Nos. 601,254 and 601,275, both filed on the same day as the present case and assigned to the same assignee, the contents of which are expressly incorporated herein by reference, for a more complete understanding of the different modes in which conglomeration of the dispersion can occur. In all cases the liquid remaining in the separation vessel is clarified and can be separated or discharged from the separation vessel.

It will be appreciated that the viscosity and conductivity of the background fluid phase need to be relatively low such that conglomeration can occur to a sufficient degree that the contaminant can be collected in a suitable manner as mentioned above before any appreciable leakage or depletion of its charge can take place such as would diminish to an ineffective level the electrical migration force acting on the contaminant. Typically the product of the viscosity and conductivity of the continuous liquid phase will not exceed $10^{-7}$ centipoise/ohm-meter, but this is not meant to be regarded as limitative in any way.

It is to be noted that when using a charge injector to introduce the net unipolar free charge, it is important that the stream velocity through the charge injector is high enough to transport the charged stream away from the electrode region of the charge injector. The stream velocity needs to exceed the drift velocity of the individual charges relative to the liquid induced by the electric field produced by the charge injector electrodes. On the other hand, the liquid in the separation vessel needs to remain there long enough to enable contaminant agglomeration and collection to occur. This generally requires a lower velocity throughput in the separation vessel than in the charge injector or holding liquid in the separation vessel until treatment is completed. In the former case, typical values for the throughput velocities in the charge injector and separation vessel are 1 m/sec and 1 cm/sec, respectively. In another embodiment the internal cross-sectional diameter of the separation vessel and the injector outlet diameter are for example 10 cms and 0.025 cms, respectively. These numerical examples are purely exemplary and have no limiting character.

It is stressed that the electric field is an induced field and not the result of voltage applied to any electrodes, and arises from the total introduced or injected charge distribution in the fluid in the separation vessel and on the contaminant/additive dispersion and any separation vessel wall surface regions or internal collector surfaces where separation occurs.

Where the continuous background phase is a gas, essentially similar considerations will apply. However, the volume throughput in the separation vessel will be considerably higher and thus will necessitate a much longer separation vessel and/or a much wider separation vessel. In addition, the flow path for the dispersion laden gas stream between the charge introducing means and the separation vessel will need to be fully enclosed.

With the present invention, it is possible to provide a method for the effective separation of contaminant, whether in solution or a dispersed phase, from a continuous fluid phase, in the latter case especially where the mean contaminant size is very small (e.g. of the order of 0.1 to 100 microns in diameter).

It will be appreciated that the invention is not limited to separating a single contaminant from the phase mixture. Two or more contaminant species may be separated, providing each of them forms, or the contaminant phases are combined to form, together with the additive, a dispersed phase within the background fluid phase.

It is to be noted that where beads are used, they need not necessarily be stationary. For example the stream of charged fluid issuing from the charge injector could be seeded with collector beads before the stream enters the separation vessel and the beads removed from the fluid again at some downstream location, in the separation vessel itself for example. Alternatively, the beads may form a fluidized bed. One way in which this can be achieved is using a concentric cylinder arrangement for the separation vessel with the beads at least partially filling the annular gap between the two cylinders and pressurising the gas space above the separation vessel to drive the charged fluid inside the inner cylinder into the annular space from below.

BRIEF DESCRIPTION OF THE DRAWINGS

The foregoing and other advantages and benefits of the invention will become apparent from the following description given, by way of example, with reference to the accompanying drawings, in which.

DESCRIPTION OF THE PREFERRED EMBODIMENTS

The technique to be described is suitable for removing a contaminant dissolved in a continuous liquid background phase. An example is a stock solution of vacuum resid in a lubricating oil. In the first step, a small quantity (typically in the range 0.01 to 10%) of finely divided particulate matter is added to a quantity of the liquid phase and the two are then intimately mixed to form a mixture. The particulate matter is chosen so that it will act as a sorbent, and is preferably an adsorbent, to the dissolved contaminant. In this way, the contaminant is brought out of solution and is adsorbed on the particulate matter.

Figure 1:
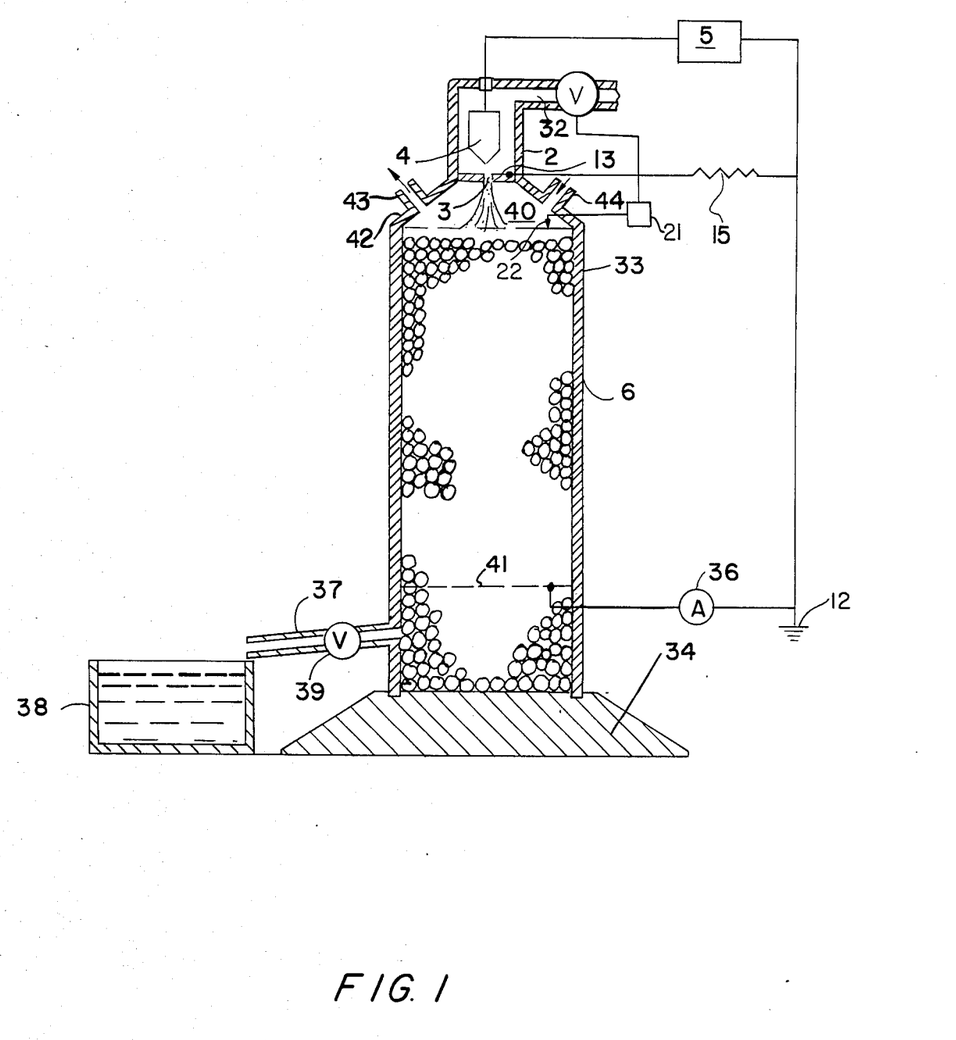
FIG. 1 shows, diagrammatically, a vertical section through one form of apparatus for separating a dispersion of contaminant adsorbed on solid particles from a liquid background phase.

The separation technique is then completed by removing the dispersion, comprising the particulate matter with adsorbed contaminant, from the background liquid phase and this is achieved using the apparatus shown in FIG. 1.

The dispersion-laden liquid is introduced through a supply line, diagrammatically shown at 32, into a charge injector which, in this example, is constructed in accordance with the teaching of the aforesaid U.S. Pat. No. 4,255,777, to which reference is made for a more complete disclosure of the construction and operation of the charge injector. However, in substance such a charge injector, as shown, essentially comprises an upright, suitably cylindrical, chamber 2 through which the dispersion-laden liquid passes, having a bottom wall 13, with an orifice or opening 3 at one end, and a sharply-pointed electrode 4 connected to the high potential terminal of power supply 5 whose earth terminal is grounded at 12, the tip of the electrode 4 being located closely above, and in exial alignment with, the opening 3. The chamber bottom wall 13 serves as a second electrode which is maintained at a lower voltage, relative to earth, than pointed electrode 4, by means of a connection to earth 12 from the lateral wall of the chamber 2 through a resistance element 15. Charge is injected by the electrode pair 4, 13, predominately by field emission into the liquid issuing through the opening 3 and the liquid issues in the form of a jet or spray, through air gap 40, into a vessel or reservoir 6 of insulating material which is located below the charge injector 1 and conveniently is an upright, preferably cylindrical, glass columnar vessel supported on a base stand 34. A metal screen 41, inside vessel 6, extends across the width of the separation vessel with closelypacked beads 33 below and above it filling substantially the entire inside volume of the separation vessel. Alternatively, screen 41 can be a support screen secured at its periphery to the cylindrical wall of the separation vessel and carrying all the beads 33 above it. The screen 41 is grounded at 12 through an ammeter 36, so as to complete the electrical circuit of the charge injector. This provides a measure of the charge level and, with the liquid flow rate, the charge density which is useful in determining the operating parameters of the charge injector. The stream issuing downwardly through opening 3 may break up into a spray at a short distance below the spray opening 3, depending on the charging potential of the charge injector, but the existence of a spray is not critical to the effective operation of the separation apparatus.

The injector 1 injects free charge of single polarity (positive or negative) into the liquid stream and this stream issues from the injector downwardly through the gap 40 onto the bed of densely-packed beads 33. The gap 40 is enclosed by a frusto-conical shaped cap 42 of the separation vessel, on which cap the charge injector body is mounted and the gas space 40 can be exposed to the atmosphere through a pipe 43 or a purge gas, e.g. nitrogen, circulated through the space 40 via inlet and outlet pipes 44, 43 passing through the wall of the frusto-conical cap, to avoid any risk of explosion or chemical reaction.

The beads need to be of low electrical conductivity and can be made of dielectric material such as plastic material or ceramic material. Preferably the beads are glass beads. An outlet 37 is provided in the wall of the vessel at a location below the top of the bed of glass beads 33, and preferably close to the bottom on the bed. The outlet pipe 37 is directed at a shallow angle below the horizontal and discharges into a collector vessel 38 for clarified or contaminant-free liquid. A controllable valve 39 in pipe 37 is periodically opened to release clarified liquid from the bottom region of vessel 6 into container 38.

In operation, with valve 39 closed and liquid in vessel 6 covering the beads 33, excess charge carriers are induced at or near the sharply pointed end of electrode 4 when this electrode is maintained at a sufficiently high negative potential with respect to bottom wall electrode 13. The charge carriers are then swept from the pointed electrode by the cross flow of liquid issuing through the opening 3. The velocity of the flow of dispersion-laden liquid discharged from the charge injector needs to be high enough for sufficient charge to be injected by the charge injector into the stream to ensure adequate effectiveness of contaminant separation in the separation region. The charged liquid is made to flow over the bed of beads 33 and liquid already in vessel 6. Preferably, as shown, the level of liquid in vessel 6 is kept just covering the top layer of beads, in order to keep the migration path length from the top surface of the liquid to the nearest glass beads to a minimum. This can be achieved by periodic opening of valve 39. Migration of the dispersion of contaminant adsorbed on the particulate additive then occurs towards the inside wall surfaces of the vessel 6, but the migrating dispersion encounters the exposed surfaces of the beads generally before reaching the vessel wall surfaces and so become deposited principally on the beads. The clarity of the liquid increases towards the bottom of vessel 6, and clarified liquid is periodically tapped-off through outlet pipe 37 by opening valve 39. From time to time, it may be necessary to replace beads 33 with new ones or to remove the soiled beads, or clean them and then re-introduce them to vessel 6, or to clean the fouled surfaces of the beads and separation vessel by backflushing, solvent washing or other suitable techniques.

In another embodiment which is not illustrated but will be self-evident from the following description, the beds 33 are omitted from the interior of the separation vessel 6 and so the inner wall surface areas of the vessel 6 serve as the sole collector surfaces for the migrating particulate dispersion.

In both embodiments, the level of liquid in the separation vessel can be maintained approximately constant by opening and closing valve 39 periodically, as described above. Alternatively the valve 3a can be set to allow a preset flow rate through it and an automatic level control arrangement is used, comprising a flow control valve 20 in the inlet line to the charge injector 1 whose setting is controlled by a controller 21 in response to the level detected by detector 22 in the upper region of separation vessel 6, so as to maintain the liquid level substantially invariant. In another arrangement, the clarified liquid from separation vessel 6 can be continuously recycled back through the charge injector 1, until a desired degree of clarity or lack of contamination of the liquid is achieved.

In batch operation, with the valve 39 closed initially and separation vessel 6 (with or without separation beads 33) empty of liquid, the charge injector can introduce charge contaminated liquid into the separation vessel until the vessel is full. The liquid supply to the charge injector is then shut off and then the valve 39 can be opened to release the clarified liquid.

The foregoing description will now be illustrated by way of an example.

EXAMPLE 1

A stock solution of 0.05% vacuum resid in a lubricating oil (S100N) having a viscosity of 36 cp was prepared. Various amounts (20 ppm, 40 ppm, 60 ppm) of carbon black were added to aliquots of the stock solution. These carbon black/vacuum resid/lube oil mixtures were mixed in a Waring blender and then subjected to separation treatment using apparatus as shown in FIG. 1.

Figure 2:
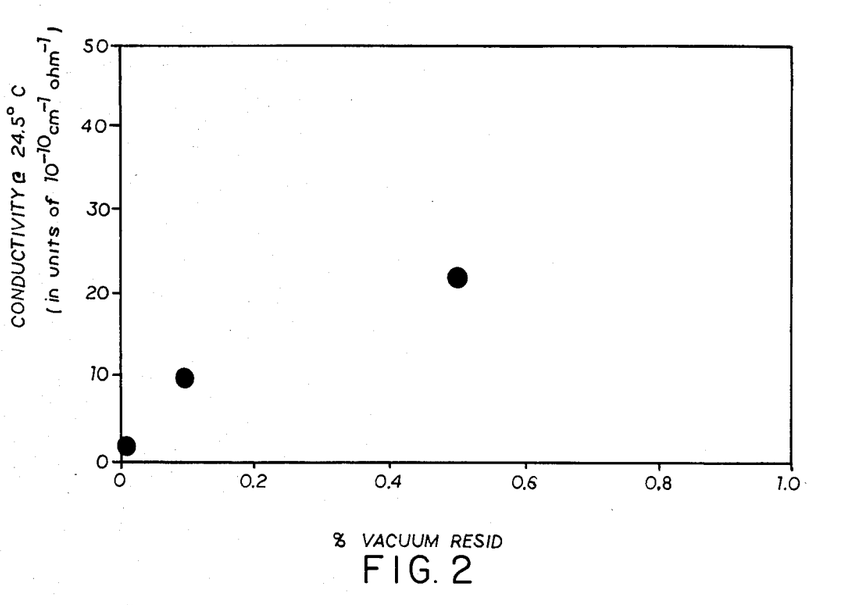
FIGS. 2 to 5 illustrate how the conductivity and adsorbency of vacuum resid in a lubricating oil vary for different concentrations of vacuum resid, and how they are reduced after the addition of carbon black particles and treatment in the apparatus shown in FIG. 1.
Figure 3:
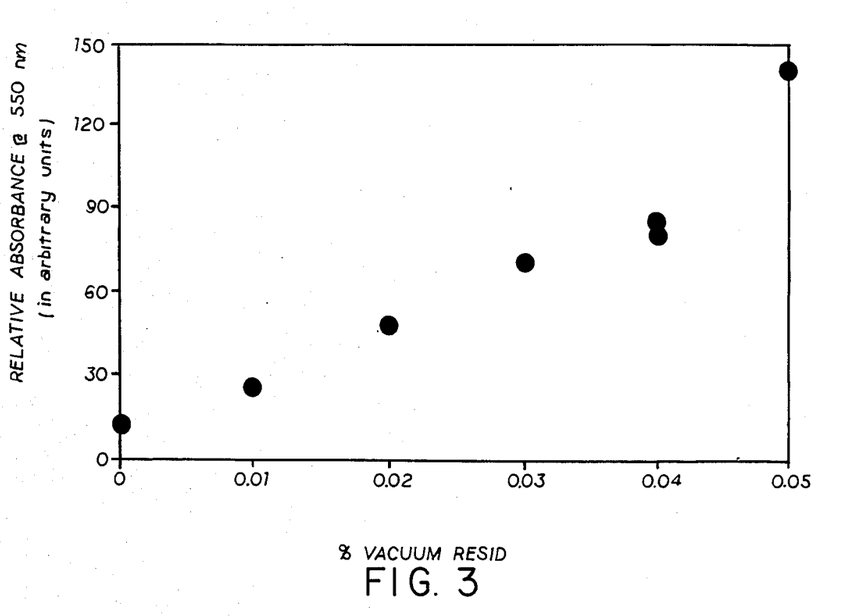

FIGS. 2 and 3 show the effect of vacuum resid on the conductivity (at 24.5° C.) and absorbency (at 550 nM) of lube oil solutions (S100N) for differing concentrations of vacuum resid, prepared in corresponding manner to the stock solution containing 0.05% vacuum resid.

Figure 4:
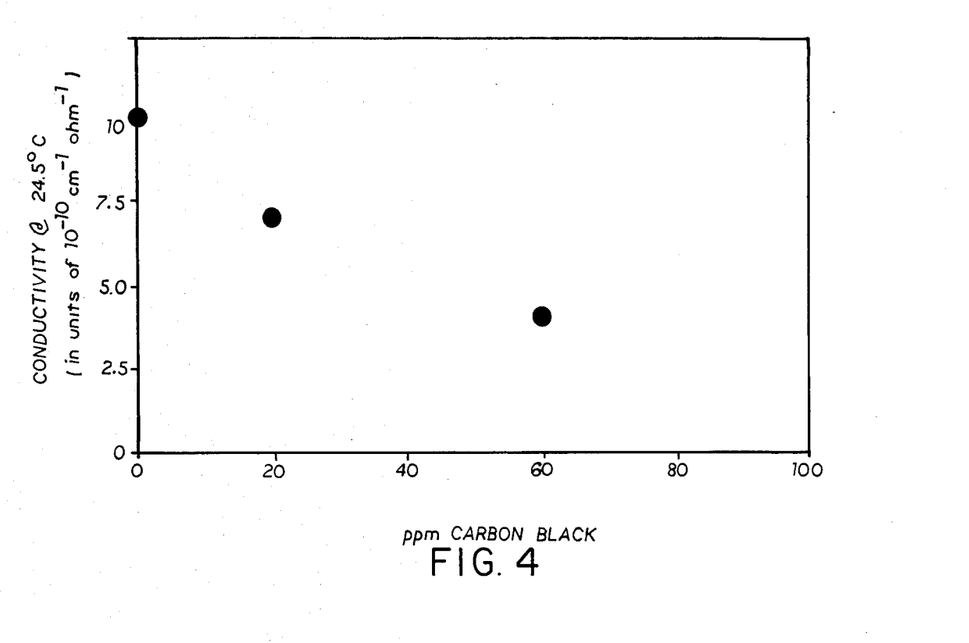
Figure 5:
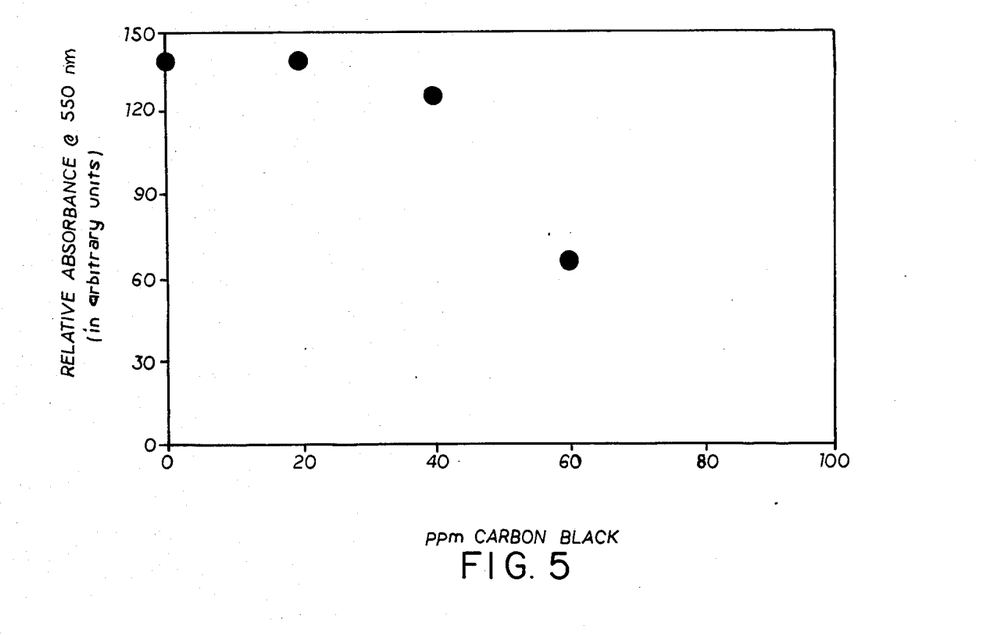

FIGS. 4 and 5 show that the conductivity and absorbency of the stock solution tested after treatment with carbon black and treatment in the dispersion treatment apparatus, both decreased. Thus, on the basis of conductivity and absorbence, the concentration of vacuum resid in the stock solution is decreased by at least 250 ppm with the addition of 60 ppm carbon black and exposure to the charge injection separation technique. However, no significant change in absorbency and only a small change in conductivity were observed when the same stock solution without carbon black was exposed to the same charge injection separation technique. It was therefore concluded that the carbon black combined with the vacuum resid and carbon black/resid and then the electrostatic separation apparatus removed the combined carbon black/resid.

The use of carbon black in the above example is not intended to limit the finely divided solid to carbon black. Thus, a silica-alumina catalyst (DA-1) was also tried and shown to combine with the resid.

EXAMPLE 2

Figure 6:
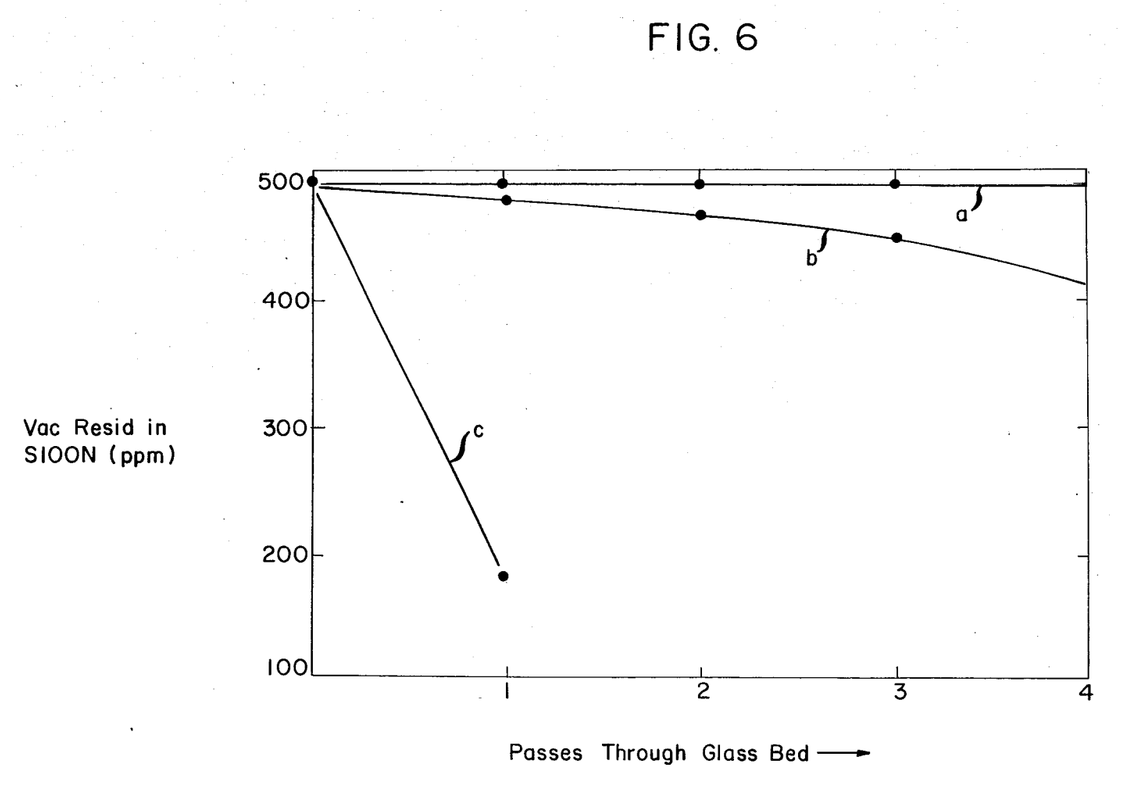
FIG. 6 is a graph depicting the results of an experiment demonstrating the improvement which can be achieved when treating a lubricating oil containing vacuum resid as a dissolved contaminant with addition of sub-micron carbon particles followed by separation in an electrostatic separator employing charge injection.

FIG. 6 illustrates the results of a further set of experiments using a stock solution containing 500 ppm of vacuum resid prepared as in Example 1. After four passes through the separation apparatus of FIG. 1 and with the charge injector switched off, no measurable reduction in concentration of the vacuum resid was detected (curve a, FIG. 6). With the charge injection, the vacuum resid concentration was reduced to just over 400 ppm after four passes (curve b). However, after only one pass when the stock solution had been mixed with 60 ppm of submicron carbon and then passed through the separation apparatus with the charge injector operating, the concentration of vacuum resid was measured at less than 200 ppm.

It is well known to those skilled in the art that smaller adsorbent particle sizes are more effective adsorbers, but with known electrostatic separation techniques, limitations exist on removal of particles of very small size from a fluid background phase. However, the charge injection separation technique as disclosed herein enables much smaller particle sizes to be removed and therefore more effective separation of the contaminant can be achieved because very small adsorbent particle sizes can be employed.

Vacuum resid is intended to be representative of all contaminants and lube oil representative of all dielectric liquids. Moreover, it is to be understood that the separating process disclosed herein is effective to separate other contaminants, whether in solid, liquid, gaseous or gel form, from continuous background liquid or gas phases.

What is claimed is:

1. A method for use in the separation of a contaminant from a fluid by producing migration of contaminant within the liquid, said method comprising the steps of:

(1) introducing into the contaminated liquid an additive which is selected so that it combines with the contaminant to form a dispersion suspended in the fluid;

(2) introducing free charge that is net unipolar into the liquid, at least predominantly by electron emission which causes the liquid to act as a medium through which volumetric distribution of the introduced charge takes place by charge motion relative to said liquid, there being a sufficient excess of free charge introduced such that the volumetric charge distribution causes an electric field to be induced in the liquid and the dispersion to become charged, and the induced electric field and the charge on the dispersed phase interact to produce an electrical driving force acting on the dispersion so that said migration of said contaminant, combined with said additive to form said dispersion, is due substantially to said driving force; and (3) allowing the migrating dispersion to accumulate in a region within a body of said liquid.

2. A method as claimed in claim 1, wherein the additive is selected so that it combines physically with the contaminant.

3. A method as claimed in claim 1, wherein the additive is selected so that it combines chemically with the contaminant.

4. A method as claimed in claim 1, wherein the additive is selected so that it combines electrically with the contaminant.

5. A method as claimed in claim 1, wherein the additive is a sorbent for combining with the contaminant.

6. A method as claimed in claim 5 for separating a dissolved contaminant from said liquid, wherein the additive comprises finely divided particles.

7. A method as claimed in claim 6 for removal of vacuum resid from a hydrocarbon oil, wherein the additive comprises carbon black particles.

8. A method as claimed in claim 6 for removal of vacuum resid from a hydrocarbon oil, wherein the additive comprises silica-alumina catalyst.

9. A method as claimed in claim 1, wherein the additive has adsorbent properties for combining with the contaminant.

10. A method as claimed in claim 1, wherein the migrating dispersion is allowed to accumulate in a region within said body of liquid adjacent at least one collector surface of dispersion collector means disposed within a vessel in contact with said liquid.

11. A method as claimed in claim 10, wherein the free charge is introduced into a stream of said contaminated liquid, at least predominantly by field emission, and the charged stream is passed through a gas or vapor space, before entering said vessel, for minimizing charge dissipation from the charged liquid in said vessel back to where the free charge introduction took place.

12. A method as claimed in claim 11, wherein the vessel interior contains a bed of beads of low electrical conductivity which are closely packed across the cross-section of the vessel and which serve as said dispersion collector means.

13. A method as claimed in claim 1 wherein the free charge is introduced without producing ionic dissociation within the phase mixture.

14. A method as claimed in claim 1, wherein said body of liquid is contained within a vessel and the migrating dispersion is allowed to accumulate in a region within said body of liquid adjacent inside wall surface areas of said vessel.

15. A method for use in the separation of a contaminant from a liquid by producing migration of contaminant within the fluid, said method comprising the steps of:
   (1) introducing into the contaminated liquid an additive which is selected so that it combines with the contaminant to form a dispersion suspended in the liquid;
   (2) introducing free charge that is net unipolar into the liquid in such manner as to cause the liquid to act as a medium through which volumetric distribution of the introduced charge takes place by charge motion relative to said liquid:
   (3) passing the charged liquid into a dispersion collection region, the charged liquid, before entering said region, being directed as a stream through a gas or vapor space for minimizing charge dissipation from the charged liquid in said region back to where the free charge introduction took place, there being a sufficient excess of free charge introduced such that the volumetric charge distribution causes, in said dispersion collection region, an electric field to be induced in the liquid and the dispersion to become charged, and the induced electric field and the charge on the dispersion interact to produce an electrical driving force acting on the dispersion so that said migration of said contaminant, combined with said additive to form said dispersion, is due substantially to said driving force; and
   (4) allowing the migrating dispersion to accumulate in a region within a body of said liquid.

16. A method as claimed in claim 15, wherein the gas or vapor space is enclosed and a purge gas is flowed through said gas space.

17. A method as claimed in claim 15, wherein the free charge is introduced predominantly by electron emission.

18. A method as claimed in claim 15, wherein the free charge is introduced without producing ionic dissociation within said liquid.

19. A method as claimed in claim 15, wherein said body of liquid is contained within a vessel and the vessel interior contains a bed of beads of low electrical conductivity which are closely packed across the cross-section of the vessel and in contact with whose surfaces the migrating dispersion is allowed to accumulate.

20. A method as claimed in claim 19, wherein the additive is a sorbent for combining with the contaminant.

21. A method as claimed in claim 19, wherein the additive has adsorbant properties for combining with the contaminant.

22. A method as claimed in claim 20 for separating a dissolved contaminant from a liquid, wherein the additive comprises finely divided particles.

23. A method of separating a contaminant from a liquid by producing migration of contaminant within the liquid, said method comprising the steps of:
   (1) introducing into the contaminated liquid an additive which is selected such that it combines with the contaminant to form a dispersion suspended in the liquid;
   (2) flowing a stream of the liquid past a pointed high potential electrode at sufficient velocity that free charge that is net unipolar is injected by field emission into the liquid and is conveyed by the flowing stream away from the high potential electrode, the free charge being injected into the liquid stream in such manner as to cause the liquid to act as a medium through which volumetric distribution of the injected charge occurs by charge motion relative to said liquid;
   (3) causing the charged stream to enter into a separation vessel through a gas or vapor space for minimizing charge dissipation from the charged liquid in the separation vessel back to where the free charge introduction took place, there being a sufficient excess of free charge introduced such that the volumetric charge distribution causes an electric field to be induced in the liquid in the vessel and the dispersion there to become charged, and the induced electric field and the charge on the dispersion interact to produce an electrical driving force acting on the dispersed phase so that said migration of said contaminant, combined with said additive to form said dispersion, is due substantially to said driving force;
   (4) maintaining the liquid in the vessel for sufficient time for at least part of the dispersion to accumulate in a region within the liquid in said vessel; and
   (5) separating the accumulated dispersion from the liquid in said vessel.

* * * * *